A. BRADFORD.
WEIGHING APPARATUS.
APPLICATION FILED AUG. 12, 1908.
923,240.
Patented June 1, 1909.
2 SHEETS—SHEET 1.
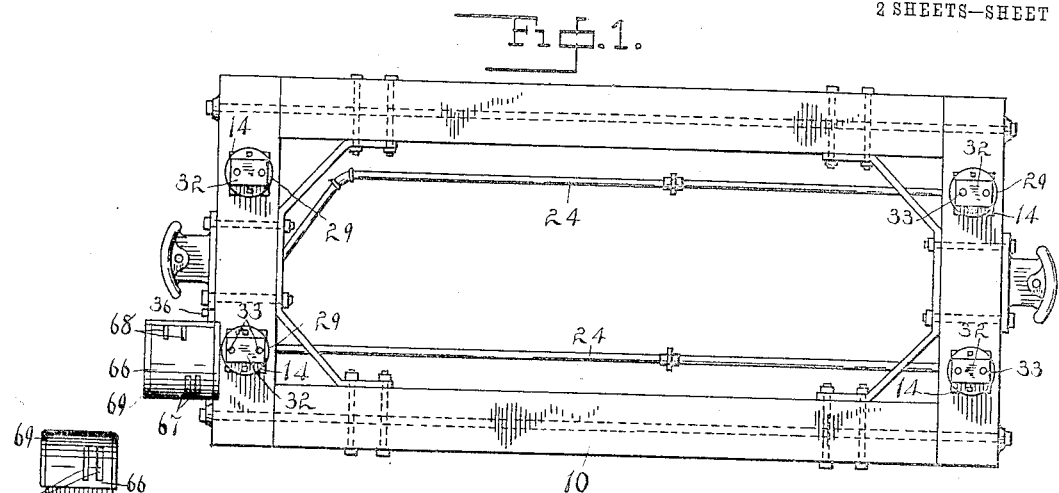
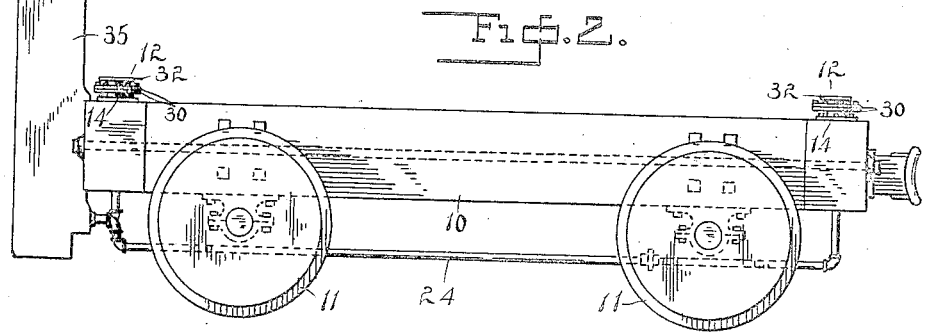
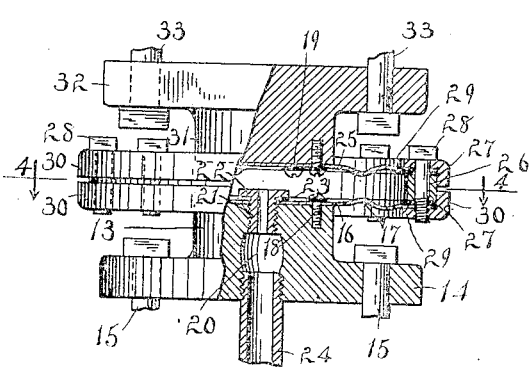
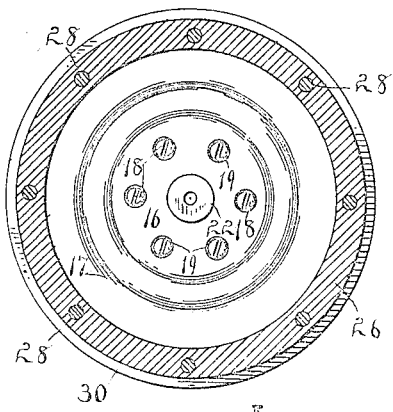
WITNESSES:
Mathew J. Marty
C. J. Barrero
INVENTOR
Allen Bradford
BY Frederick Benjamin
ATTY.

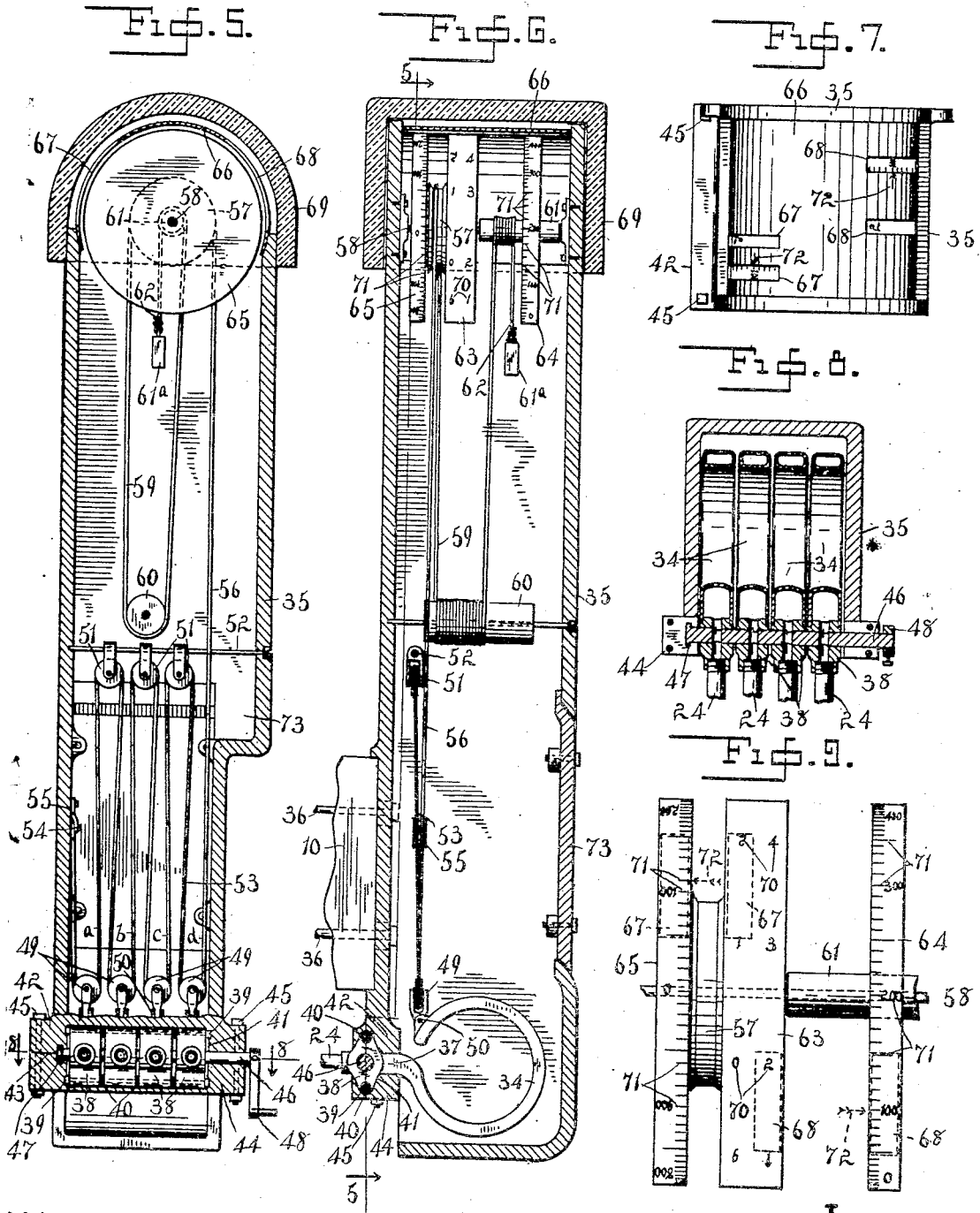

UNITED STATES PATENT OFFICE.

ALLEN BRADFORD, OF KENNETT, CALIFORNIA.

WEIGHING APPARATUS.

No. 923,240.   Specification of Letters Patent.   Patented June 1, 1909.

Application filed August 12, 1908. Serial No. 448,137.

*To all whom it may concern:*

Be it known that I, ALLEN BRADFORD, citizen of the United States, residing at Kennett, in the county of Shasta and State of California, have invented certain new and useful Improvements in Weighing Apparatus, of which the following is a specification.

My invention relates to weighing apparatus and has especial reference to appliances of the type in which hydraulic means are employed for transmitting the pressure and operating the indicator.

The paramount objects of the improvements which form the subject matter of this application are:—to provide a means for determining weights in which the production of friction will be reduced to a minimum; to produce a weighing machine that will be more convenient when applied to particular purposes than those in ordinary use, and to furnish a simple appliance, having comparatively few parts, thus being durable and less likely to get out of order, insuring accuracy, and permitting the apparatus to be manufactured economically.

Referring more in detail to the results attained by this invention, the mechanism employed to indicate the weights is so arranged as to be readily observed from the ordinary position of the operator's eyes, and as a further convenience duplicate dials or indicators are employed, thus enabling the readings to be taken with equal facility from opposite sides of the apparatus. Since the devices are mainly intended to be applied to weighing cars, this design will be particularly useful, as in former arrangements the weigher was obliged to view the index from one side only.

The objects sought are accomplished by the construction illustrated in the accompanying drawing, forming a part of this application, in which the various details are shown in the following views:—

Figure 1 is a plan view of a car frame, equipped with my improved hydraulic weighing apparatus; Fig. 2 is a side elevation of the structures shown in Fig. 1, with the addition of track wheels supporting the frame; Fig. 3 is a side elevation, partly in section, of one of the hydraulic tambours; Fig. 4 is a sectional view taken on the line 4—4 of Fig. 3; Fig. 5 is a sectional view on the line 5—5 of Fig. 6; Fig. 6 is a vertical section through the indicator casing and contained mechanism; Fig. 7 is a top plan view of the indicator with the glass cap removed; Fig. 8 is a sectional view on the line 8—8 of Fig. 5, and Fig. 9 is an enlarged view of the indicating wheels and spindle.

Referring to the details of the drawing the numeral 10 indicates the frame of a car, supported on track wheels 11. At opposite ends of the frame are located four hydraulic drums or tambours 12 for supporting a suitable frame, not shown in the drawing since it does not concern the present improvements. The said drums are constructed in the following manner: A cylindrical base block 13 (Fig. 3) has a rectangular flange 14, attached to the frame 10 by bolts 15. Upon the level top of the block or base 13 is mounted a circular plate or diaphragm 16. This plate is furnished with annular corrugations 17 concentric with the plate and surrounding the central flat portion which is in apposition with the base 13, and through this pass screws 18 furnished with gaskets or washers 19 securing the said plate or diaphragm firmly to the base. The latter is furnished with a central bore 20, having internal threads at its upper and lower ends. Into the upper end of this bore is screwed a hollow bolt or nipple 21, passing through the diaphragm 16, and having a head or flange 22, beneath which is a gasket 23, and into the lower end is inserted a pipe 24, which leads to the indicator, hereinafter described. A diaphragm 25, similar to the diaphragm 16, is superposed thereover, the two plates being separated by a marginal ring 26, annular gaskets 27 being interposed between the ring and the plates, and the whole firmly bound together by bolts 28 which pass through clamping rings 29, having protective flanges 30, covering the margins of the diaphragms and annular gaskets 27. To the center of the upper diaphragm 25 is secured a solid cylindrical block 31 the mode of attachment being similar to that employed for connecting the lower diaphragm with the base 13. The block 31 also has a rectangular flange 33, through which pass attaching bolts 33.

The cavity of each tambour or drum is separately connected by its pipe 24 with a spring pressure gage tube 34. Since there are four drums there are necessarily the same number of gage tubes. These are conveniently located at the end of the supporting frame 10, and are arranged side by side in a battery in the lower part of a casing 35, as shown in Fig. 5, the casing being attached to the end frame members 10 by bolts 36. The tubes 34 are such as are commonly used in pressure gages being flattened in cross section and curved on the flat into nearly complete rings from which project straight portions or inlets 37 arranged radially to the annular portions and passing through supporting blocks 38. These blocks are clamped together by bolts 39, suitable rubber spacing washers 40, being interposed between them, and are located in a rectangular opening 41 in an enlargement 42 of the casing plate. This enlargement is split horizontally on the line 43 to facilitate assembling, the removable portion or plate 44 being secured to the main casing by bolts 45. The inlets 37 are controlled by a universal stop cock having its stem 46 extending entirely through the entire set or battery, and provided with a retaining collar 47 and a suitable lever or crank 48, for manually operating the cock. This cut off is closed when the car is in motion to prevent the jolting and sudden shocks from being transmitted to the sensitive indicating devices.

To the free or closed ends of the gage tubes 34, grooved pulleys or sheaves 49 are hinged at the points 50, and at a suitable distance above these sheaves are a second series of pulleys 51 loosely suspended upon a rod 52 supported in the casing. A suitable cord 53 is fixed by passing the end around the smooth portion of an adjusting bolt 54 between a spring tongue 55 and the casing where it is then firmly clamped by turning the said bolt 54. This cord is then passed around the sheaves 49, and 51, alternately, in the manner shown in Fig. 5 and after leaving the last pulley of the series 49 it is carried upward, as indicated at 56, to the upper part of the casing where it is given a single turn about a grooved wheel 57 loosely mounted on a shaft 58. It then descends, as indicated at 59, to an idler 60, and again ascends to a windlass or roller 61 mounted on the said shaft 58, about which it is wound a sufficient number of times to prevent slipping, and a weight 61$^a$ attached to the pendent end. The said cord is wound about the idler 60 sufficiently to bring the ascending portion 62 to a position directly underneath its point of engagement with the said windlass 61 so as to prevent interference with an intervening indicating wheel 63, fixed to the grooved wheel 57. Upon the windlass 61 is mounted an indicating wheel 64, and upon the shaft 58 upon the other side of the grooved wheel 57 is another indicating wheel 65, similar to the wheel 64. It will be seen that by this arrangement the wheels 57 and 63 will move in unison independently of the shaft 58, while the similar wheels 64 and 65 will move with the said shaft and windlass 61 and, of course, independently of the wheels 57 and 63. The upper ends of the casing sides at right angles to the shaft 58 are rounded, or semi-circular in outline, having a curvature corresponding with that of the wheels and supported thereon is a semi-circular cover 66, consisting of a thin metal plate. This cover is furnished with sight openings 67, 68, arranged in pairs upon opposite sides and corresponding with the different indicating wheels. Over the entire top of the casing is placed a cap 69 of glass through which the said indicating wheels may be readily observed, and owing to the duplication of the said wheels the readings of the figures marked thereon may be had from either side alike, a description of the manner of calibrating the indicating devices and their relative movements and values being hereinafter described.

When the universal stop cock 46 is open, the cavities of the drums or tambours 12 and those of the annular gage tubes 34, communicate through the pipes 24, each drum being thus connected with its respective tube, and no other, as previously mentioned. These cavities are completely filled with some suitable non-compressible fluid, such as oil or glycerin. The corrugated diaphragms 16 and 25 of the drums are made of comparatively thin elastic plates and the corrugations strengthen the plates so that they will sustain the required pressure without destroying or materially impairing their flexibility. Any increase in the pressure brought to bear upon the liquid confined within a drum will be instantly transmitted to the pressure-gage tube connected therewith, and as the tendency of such pressure will be to straighten the tube, the free end thereof will be carried upwardly to a certain extent, the amount depending upon the physical and structural relation and adjustment of the parts, and when the pressure is removed the resiliency of the tubes and diaphragms will restore the parts to their normal positions. This movement of the tube end is magnified and transmitted to the index wheels by means of the compound system of pulleys arranged as previously described. According to the well known law applicable to the cord and pulley, when the first pulley 49 rises, the part $a$ of the cord will move twice the distance; when the second pulley 49 rises, the part $b$ will travel twice that distance plus the movement of $a$, and this law will hold good through $c$ and $d$, the latter moving eight times the distance of the aggregate movements of all the pulleys 49. The circumference of the wheel 57 bears such a relation to the capacity of the scales that the maximum load resting upon the drums will cause one complete revolution of the wheel. In the apparatus herein described the maximum weight is put at 10000 lbs. and the face of index wheel 63, which moves with the wheel 57 is divided into 10 equal parts, each indicating 1000 lbs. The circumference of the windlass 61 has a ratio of 1 to 10, relative to the wheel 57, and the attached index wheels are conveniently divided into 10 equal parts, each representing 100 lbs. minor subdivisions being placed between to indicate 10 lbs. or less, as may be desired. The major index wheel 63 has two series of divisions marked upon its face, the sequence of the figures 70 being relatively reversed, and the corresponding sight openings are staggered, thus permitting each series to be read from one side only. The minor index wheels 64, 65, each have a single series of divisions 71 marked thereon with the figures relatively reversed in the different wheels for the same purpose as in the case of the major wheel 63.

Upon the metal cover opposite each sight opening for the minor wheels is placed an index mark 72 to indicate the reading point for that wheel. No such index is required for the major wheel 63 since the corresponding sight openings are of such a length, relative to the spacing of the wheel, that only one of the figures 70 will be visible at a time.

Should the scale get out of balance and require readjusting this can be readily done by loosening the bolt 54 and moving the end of the cord until the 0 upon each index wheel 64, 65, registers with its index 72, and clamping the end in the new position, a removable plate 73 permitting convenient access to the interior of the casing for this purpose. While the tubes 34 move independently of each other and will have variable movements, especially when the weight of the load is unevenly distributed to the drums 12, it will be readily understood that the flexible tackle, comprising the cord and pulleys described, will act as a compensating device so that the aggregate of the pressures upon the corrugated diaphragms of the drums will be accurately indicated.

While I have shown my improved hydraulic system of weighing as applicable to a car, it is evident that it may be used with other appliances, or be installed as a stationary scale, and I do not wish therefore, to be limited to the precise construction disclosed.

Having thus described my invention, what I claim as new, is:—

1. In a hydraulic weighing apparatus, the combination of a plurality of receptacles, resilient walls for said receptacles, resilient curved tubes communicating with the cavities of the receptacles, indicating mechanism, and means connected with the said tubes for controlling said mechanism.

2. In a hydraulic weighing apparatus, the combination of a plurality of resilient receptacles, resilient curved tubes, pipes connecting each tube with one of said receptacles, indicating mechanism, and means connected with said tubes for controlling the indicating mechanism.

3. In a hydraulic weighing apparatus, the combination with a supporting frame, of a plurality of receptacles having flexible walls, resilient curved tubes having one end closed, pipes connecting each of said tubes with one of said receptacles, and means for indicating the aggregate movements of said tubes.

4. In a hydraulic weighing apparatus, the combination with a suitable support, of a plurality of closed receptacles, corrugated resilient walls for the receptacles, a plurality of curved resilient tubes each fixed at one end and having the free end closed, and means for indicating the aggregate movements of the free ends of said tubes.

5. In a hydraulic weighing apparatus, the combination with a suitable support, of a plurality of closed receptacles, said receptacles comprising corrugated elastic diaphragms, spacing rings and means for clamping the diaphragms upon the rings, resilient curved tubes fixed at one end and having their free ends closed, and means for indicating the aggregate movements of the free ends of said tubes.

6. In a hydraulic weighing apparatus, the combination with a suitable support, of a plurality of closed receptacles, having resilient walls, resilient curved tubes fixed at one end and having their free ends closed, a series of pipes independently connecting each tube with one of said receptacles, a universal stop cock for the inlets of said tubes, and means for indicating the aggregate movements of the free ends of said tubes, said indicating means arranged to be observed from opposite sides.

7. In a hydraulic weighing apparatus the combination with a suitable support, a plurality of closed receptacles, resilient walls for the receptacles, a plurality of tubes closed at one end and having their opposite ends fixed and pipes connecting each of said tubes with one of said receptacles independently of the other receptacles and the remaining tubes, of an indicator, and compensating means for transferring the aggregate movements of the free ends of said tubes to said indicator, said compensating means comprising grooved pulleys pivotally attached to the free ends of the tubes, corresponding fixed pulleys, and a suitable cord engaging said pulleys, one end of the cord being attached to a fixed point and the other engaging the indicator mechanism.

8. In a hydraulic weighing apparatus, the combination with a frame, supports for the material to be weighed, and counterbalancing means therefor, of an indicator comprising a casing, and three indicating wheels arranged to be observed from opposite sides of the casing, two of said wheels having their indicating figures relatively reversed in order having a movement relatively greater than the third wheel, said third wheel having two series of figures arranged in reverse order.

In testimony whereof I affix my signature in the presence of two witnesses.

ALLEN BRADFORD.

Witnesses:
RALPH BROWN,
N. McDONALD.